Jan. 18, 1955   O. WIRTH   2,699,902
COIL WINDING MACHINE
Filed June 21, 1950   2 Sheets-Sheet 1
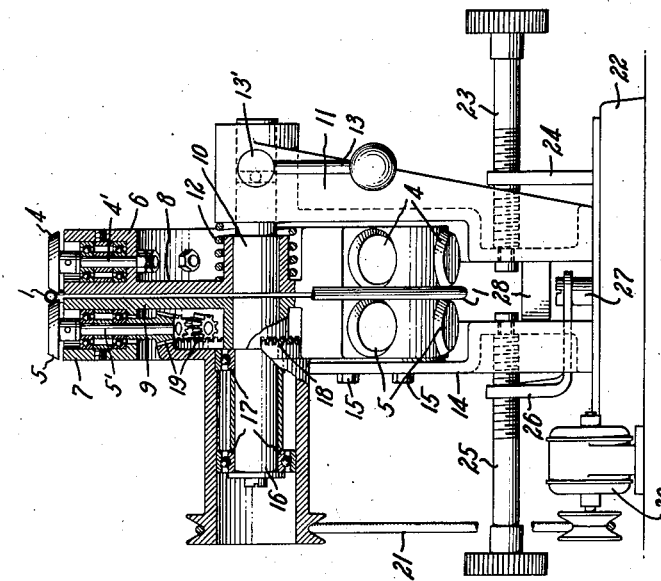
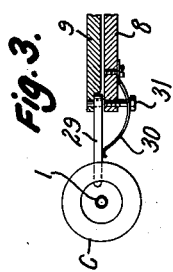
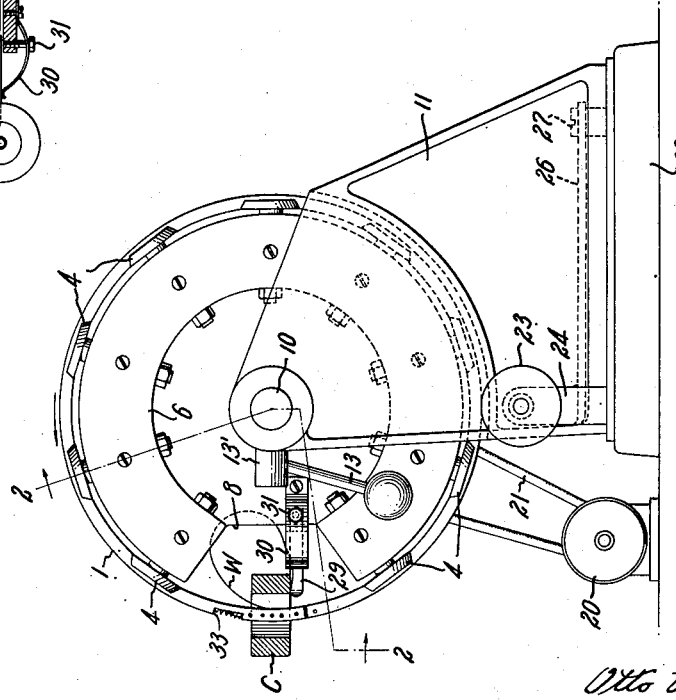
INVENTOR:
Otto Wirth,
BY Pierce, Scheffler & Parker.
ATTORNEYS.

Jan. 18, 1955 O. WIRTH 2,699,902
COIL WINDING MACHINE
Filed June 21, 1950 2 Sheets-Sheet 2

INVENTOR:
Otto Wirth,
BY Pierce, Scheffler & Parker,
ATTORNEYS.

United States Patent Office 2,699,902
Patented Jan. 18, 1955

2,699,902

COIL WINDING MACHINE

Otto Wirth, Zurich, Switzerland, assignor to Micafil A.-G., Zurich-Alstetten, Switzerland Application June 21, 1950, Serial No. 169,393

Claims priority, application Switzerland June 28, 1949

17 Claims. (Cl. 242—4)

This invention relates to coil winding machines and more particularly to machines for winding fine wire on small forms or cores including closed ring cores.

The more conventional types of coil winding machines are not well adapted to handle fine wire for purely mechanical reasons. It has been proposed to wind fine wires upon small ring cores by machines in which the winding material, in the form of a helix, was located in a two-part winding ring of tubular section which is threaded through the ring core. The wire was drawn through an opening at the inside of the winding ring or bobbin which was supported and rotated by a plurality of rollers on axes parallel to the axis of the winding ring. The winding machine was open to the objection that, as the take-off point of the winding ring moved through the ring core and then moved away from the core by approximately the diameter of the winding ring, the wire was drawn into loops which could not be withdrawn into the winding ring as the take-off point moved back towards the core and, due to insufficient guiding, a loop could and frequently did become entangled or "kinked" and sharply bent back upon itself. These sharp bends or kinks were destructive of the insulation and, in some instances, the fine wire parted under the winding tension.

Objects of the present invention are to provide, in machines for winding fine wire on small forms and cores, including closed ring cores, constructions which preclude the entanglement of the wire as it is drawn into loops during the winding process. An object is to provide a winding machine in which the wire is so closely confined between planar parallel surfaces as it is drawn from a winding ring or bobbin, that there is substantially no possibility of the formation of entanglements or kinks in the wire. More specifically, an object of the invention is to provide a winding machine of the character stated in which the winding wire is stored within a circular winding ring or bobbin member of tubular form which may be threaded through the closed ring core on which the coil is to be wound, and the winding ring is supported by a set of driven rollers and a complementary set of idler rollers carried by frame members which have closely adjacent and parallel planar surfaces which preclude entanglement of the wire loops which are necessarily formed in the winding operation. An object is to provide a machine of the type stated in which the supporting rollers are carried by the respective frame members for rotation about axes which are positioned radially with respect to the winding ring which they support and drive.

These and other objects and the advantages of the invention will be apparent from the following specification when taken with the accompanying drawings in which:

Fig. 1 is a side elevation of a winding machine embodying the invention;

Fig. 2 is a front elevation, with parts in section as indicated by line 2—2 of Fig. 1;

Fig. 3 is a fragmentary horizontal sectional view looking down upon the core and the wire tensioning mechanism;

Figure 4:
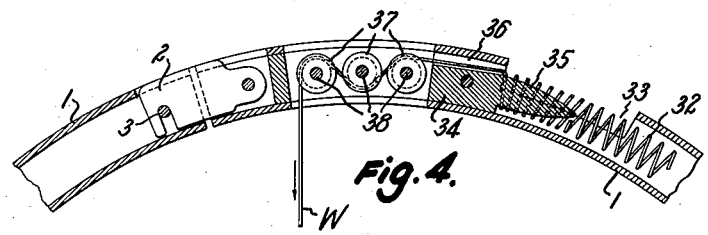
Figs. 4 and 5 are fragmentary vertical sections, on a larger scale, through winding rings of different form.

In Figs. 1 and 4 of the drawings, the reference numeral 1 identifies a winding wire support which comprises a radially split and circularly bent steel tube with a notched latch 2 pivotally mounted at one end to engage a pin 3 at the other end to retain the tube in circular ring form. The tube is thus radially split to permit it to be threaded through a small ring core C upon which a coil of fine wire is to be wound. The ring tube 1 is supported on complementary sets of rollers 4, 5 of frusto-conical form on shafts 4', 5' respectively which are journalled in arcuate flanges 6, 7 which extend around the major portions of the outer faces of frame or plate members 8, 9 respectively. The axes of the shafts 4', 5' extend radially of the axis about which the winding ring 1 rotates, and the inner faces of the frame members are planar and parallel. The space between the members 8 and 9 is quite small, for example about 1 mm., to permit the wire to be drawn through it without friction while at the same time preventing substantial lateral movement of the wire which might result in entanglements and kinks. Except where interrupted to provide space for the coil C, the frames or plates 8, 9 extend outwardly into close proximity to the ring 1 on the supporting rollers 4, 5.

The member 8 is fixed to a shaft or rod 10 which is slidably supported in a bracket 11, and it is pressed towards the member 9 by a coiled spring 12 which surrounds the shaft 10. The series of idler rollers 4 are thus held in frictional engagement with the winding ring 1 and, in turn, they press the winding ring 1 into frictional engagement with the driven rollers 5. The frame member 8 may be manually shifted towards the right, Fig. 2, for the removal or replacement of a winding ring 1, by rocking the handle 13 of a shaft 13' which has an eccentric pin, seated in a vertical slot through the shaft 10. The member 9 is secured to a bracket 14 by bolts 15 and a stationary shaft 16 is secured to and axially of the member 9 to support the bearings 17 for the sleeve portion of a bevel gear 18. The gear 18 is in mesh with small bevel gears 19 fixed to the several shafts 5', and the gear 18 is driven in such sense by a motor 20 and belt 21 that the winding ring 1 is rotated counterclockwise as viewed in Fig. 1.

The brackets 11 and 14 are secured to a supporting base 22 by bolts, not shown, which extend through slots in the base and are threaded into the brackets. The bolts may be tightened to fix the brackets in place but, and preferably, they hold the brackets to the base but permit sliding adjustments of the bracket positions to compensate for displacements of the axis of a ring core with respect to the winding machine during a winding operation. For adjustment of the bracket 11 axially of the winding ring 1, a screw 23 is threaded through a standard 24 fixed to the base and has its inner end rotatably secured to the bracket 11. A screw 25 is threaded through a strap 26 which is supported on a stud 27 at the back of the base 22, and its inner end is rotatably secured to the bracket 14. A spacer or distance piece 28 is secured to one of the brackets, for example the bracket 11 as shown in Fig. 2, to engage the other bracket as a stop which insures a desired minimum width of the gap between the opposed surfaces of the frame members 8, 9.

The small ring core C which is to be wound with wire W stored within the winding ring 1 is supported by any known or desired means which turns or oscillates the core about its axis during the winding operation. The wire on the core C must be maintained under tension when the take-off point of the winding ring 1 moves away from and back to the core C and, to maintain the tension, a guide strip 29 is mounted on the member 9 to press lightly against the lower surface of the core winding and a leaf spring 30 is secured to the member 8 to press against the guide strip 29. The outer end of the spring 30 is flared away from the guide strip 29 and the wire will be drawn between the spring and the guide strip. The pressure exerted upon the wire may be regulated by adjustment of a screw 31 which passes through the spring 30 and is threaded into the member 8.

As shown in Fig. 4 the wire W may be stored in the ring 1 in the form of a pre-wound single layer helix 32. The ring 1 has a slot or opening 33 at its outer side through which the coil 32 may be inserted and a supporting block 34 with a conical or tapered seat 35 for the coil is fixed within the tube 1 at the left or counterclockwise of the opening as viewed in Fig. 4. The block 34 has a circumferential groove 36 through which the wire passes to a roller, or preferably as shown, a plurality of rollers 37 which are rotatable on shafts 38 extending through the ring 1 and the supporting block 34. For some wire sizes, non-rotating pins may be substituted for the rollers which smooth out and retard the movement of the wire out of the ring 1. The helix or coil 32 rotates on the tapered seat as the wire is drawn off to form a coil on the core C. The preformed helix 32, as wound in and relaxed state, has a diameter somewhat smaller, say 0.5 mm. smaller, than the internal diameter of the ring 1.

Figure 5:
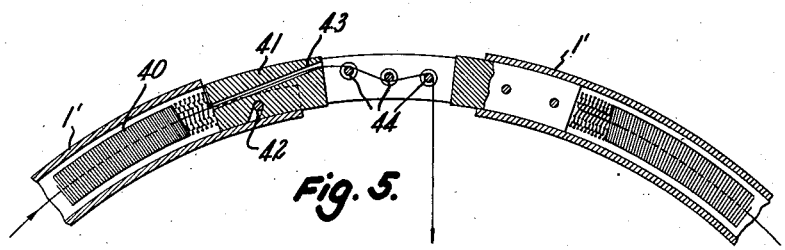

This arrangement of a single layer helix which rotates on the tapered seat of the supporting block 34 is quite satisfactory for fine wires of the order of U. S. Gauge No. 32 (0.0095 inch or about 0.2 mm. diameter) and larger but, for smaller size wires, a helix will not rotate satisfactorily on a support as shown in Fig. 4. These wires are stored within a winding ring 1', see Fig. 5, in the form of a banked multilayer coil 40 which is seated upon, but does not rotate with respect to, the radially disposed end of an arcuate coupling rod 41 which is fixed to one end of the radially split tube 1' and is notched to fit upon a latch pin 42 which extends transversely of the other end of the tube 1'. The winding ring or tube 1' may be opened by pulling the ends apart, and its normal unstressed radius is somewhat less than the radius of the closed ring, whereby it is resiliently latched in ring form when the coupling rod 41 is engaged with the latch pin 42.

Figure 6:
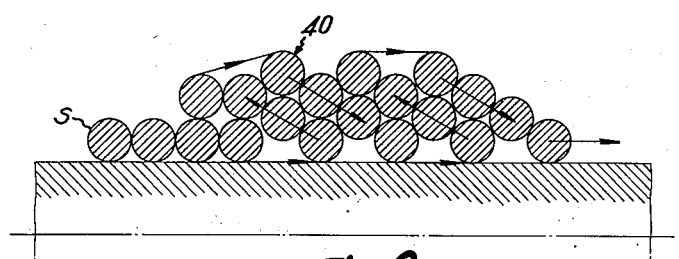
Fig. 6 is a fragmentary plan view, with parts in section, of a prewound coil of wire for insertion in the Fig. 5 winding ring.

The stored wire coil 40, Fig. 6, is prepared by winding the fine wire on a mandrel, which is driven from the spindle of a winding machine not shown, for forming honeycomb coils, so that it rotates continuously during the winding process. The wire guide of the winding machine in which the mandrel is rotatably supported performs two movements, a back and forth movement of about 3 millimeters and a progressive displacement axially of the mandrel from the beginning to the end of the latter. The reciprocating motion produces the successive layers of wire with a maximum displacement of about 20°. The elongated multilayer winding thus consists of a continuous sequence of short overlapping sections of spiral windings. In order to enable the finished coil to be readily removed from the mandrel, the latter consists of two rods of semicircular cross-section which by means of a spreading plate located in the wire guide are temporarily distended at the point where the wire is being wound on the mandrel. After the multilayer coil has been completed the mandrel is thus loose inside the coil and can easily be withdrawn. The coil 40 after it is inserted into the tube 1' is unwound in the sense in which it is wound, the starting end S of the banked multilayer coil being drawn through the bore of the coil 40 and then through a passage 43 in the coupling rod 41, whereupon it passes over a plurality of pins 44 extending transversely of a slot in the rod 41 to the core C which is to be wound. The winding or coil 40 is self-supporting and can easily be bent to arcuate form for insertion in the ring tube 1'. Since the winding 40 does not rotate during unwinding, the off-running wire is not twisted and there is a minimum resistance to the withdrawal of the wire from the winding 40.

It is to be understood that the invention is not limited to the particular apparatus herein illustrated and described and that various modifications which may occur to those familiar with the art fall within the spirit and scope of the invention as set forth in the following claims.

Claims to the method of and apparatus for winding the banked multilayer coil are presented in my continuation-in-part application Serial No. 443,930, filed July 16, 1954.

I claim:

1. A machine for winding fine wire on small closed ring cores and of the type including a circularly bent and radially split tube within which the winding wire is stored, and means supporting the tube for rotation through the core, characterized by the fact that said supporting means comprises complementary sets of rollers for frictional engagement with said tube at opposite faces thereof, said rollers being rotatable about axes extending radially of the rotational axis of the tube, opposed frame members each carrying one of said sets of rollers, and pressure means yieldingly urging one frame towards the other to engage said rollers with said tube; said frame members having closely adjacent parallel planar surfaces restricting lateral movement of the wire loop formed from the winding wire during rotation of the circularly bent tube through a core.

2. A machine as recited in claim 1, wherein means is provided for positively driving one set of rollers, the other set of rollers being idler rollers in frictional engagement with said circularly bent tube.

3. A machine as recited in claim 1, in combination with a base member, means supporting one frame member in substantially fixed position on said base member, and means supporting the other frame member on said base member for sliding movement, said pressure means yieldingly urging the said other frame member towards the relatively stationary frame member.

4. The invention as recited in claim 1, wherein said rollers are of frustoconical form.

5. The invention as recited in claim 1, wherein each roller of one of said sets is mounted on a shaft having a gear secured thereto, and a motor-driven gear meshes with the gears on said shafts.

6. In a machine for winding fine wire upon cores, including small closed ring cores; a winding ring carrying the wire which is to be wound, means on the ring for smoothing and tensioning the wire as it is withdrawn from the ring, the core being supported with the portion thereof which is to receive the winding within the winding ring and adjacent the inner circumference thereof, means supporting said winding ring for rotation about its axis, said supporting means including opposed sets of rollers engaging opposite sides of said winding ring and opposed plate members carrying the respective sets of rollers, the adjacent faces of said plate members being planar and parallel and extending outwardly substantially to said winding ring except at the region at which the portion of the core is positioned within said winding ring, the spacing of said planar and parallel faces being of the order of one millimeter, resilient means establishing frictional engagement of said sets of rollers with said winding ring, and power means to drive one of said sets of rollers, thereby to rotate said winding ring.

7. The invention as recited in claim 6, in combination with a base, and wherein said supporting means includes brackets mounted on said base and carrying the respective plate members, means securing one of said plate members to its bracket, means mounting the other plate member upon its bracket for limited movement thereon in a direction parallel to the axis of rotation of said winding ring, and manually operable means for moving the second plate member away from the first plate member for removal or replacement of a winding ring on said opposed sets of rollers; and wherein said resilient means is positioned between said second plate member and its bracket to press said second plate member towards the first plate member.

8. The invention as recited in claim 6, wherein the rollers of the set carried by the first plate member are on shafts having gears fixed thereto, and said power means includes a gear in mesh with all of the gears on said shafts.

9. The invention as recited in claim 8, wherein the rollers of the other set are idler rollers.

10. The invention as recited in claim 6, in combination with a guide strip carried by a plate member to guide the winding wire into a plane passing between said opposed plate members as it is wound upon the frame or core, and a tension-retaining spring mounted on a plate member for resiliently holding the winding wire in contact with said guide strip as the wire is drawn around said form or core and against said guide strip.

11. The invention as recited in claim 10, in combination with means adjustable to regulate the pressure imposed upon the winding wire by said tension-retaining spring.

12. The invention as recited in claim 11, wherein the guide strip and the tension-retaining spring are carried respectively by different plate members.

13. The invention as recited in claim 6, wherein the winding ring comprises a circumferentially incomplete tube of circular form within which the wire to be wound is stored, and adjustable coupling means on the opposite ends of said tube for latching the ends thereof to form a closed winding-carrying ring which may be, upon opening of said coupling means, threaded through a closed ring core.

14. The invention as recited in claim 13, wherein said means for smoothing and tensioning the wire as it is withdrawn from the winding ring is supported by said coupling means.

15. The invention as recited in claim 14, wherein said smoothing and tensioning means includes a plurality of pins over which the wire is threaded.

16. The invention as recited in claim 14, wherein said smoothing and tensioning means includes a plurality of rollers over which the wire is threaded.

17. The invention as recited in claim 6, in combination with a base, a pair of brackets slidably supported upon said base, means supporting the respective plate members on said brackets, and manually operable means for adjusting the respective brackets upon said base.

References Cited in the file of this patent

UNITED STATES PATENTS

| Number | Name | Date |
|---|---|---|
| 674,078 | Cree | May 14, 1901 |
| 1,879,882 | Pullets | Sept. 27, 1932 |
| 1,940,175 | Loubet | Dec. 19, 1933 |
| 2,185,883 | Berger | Jan. 2, 1940 |
| 2,192,694 | Quinlan | Mar. 5, 1940 |
| 2,263,972 | Leoser | Nov. 25, 1941 |
| 2,327,211 | Pash | Aug. 17, 1943 |
| 2,425,511 | Conklin | Aug. 12, 1947 |
| 2,467,286 | Young et al. | Apr. 12, 1949 |
| 2,472,089 | Brennan | June 7, 1949 |